(12) United States Patent
Sireix

(10) Patent No.: US 6,544,159 B2
(45) Date of Patent: Apr. 8, 2003

(54) METHOD FOR MANUFACTURING A PRESS-ON LID FOR A TUBULAR PACKAGING AND LID MANUFACTURED BY IMPLEMENTING THE METHOD

(75) Inventor: Georges Sireix, 9A Rue St-Marc, 68400 Riedisheim (FR)

(73) Assignee: Georges Sireix, Riedisheim (FR)

( * ) Notice: Subject to any disclaimer, the term of this patent is extended or adjusted under 35 U.S.C. 154(b) by 45 days.

(21) Appl. No.: 09/758,671

(22) Filed: Jan. 11, 2001

(65) Prior Publication Data

US 2002/0017074 A1 Feb. 14, 2002

(30) Foreign Application Priority Data

Jan. 18, 2000 (FR) .............................. 00 00597

(51) Int. Cl.7 ................................. B31C 1/04
(52) U.S. Cl. ..................... 493/308; 493/102; 493/158; 493/128; 493/115
(58) Field of Search ................ 493/102, 104, 493/108, 158, 159, 128, 129, 150, 115; 53/471, 478, 485, 486, 290

(56) References Cited

U.S. PATENT DOCUMENTS

| 1,597,978 | A | | 8/1926 | Hulbert |
| 2,677,318 | A | * | 5/1954 | Torudd et al. ............... 229/5.5 |
| 2,832,522 | A | * | 4/1958 | Schlanger ................... 229/406 |
| 5,524,817 | A | * | 6/1996 | Meier et al. ................. 229/4.5 |
| 6,001,053 | A | * | 12/1999 | Rabe .......................... 493/374 |
| 6,176,069 | B1 | * | 1/2001 | Kossendrup ................ 493/108 |
| 6,179,203 | B1 | * | 1/2001 | Toussant et al. ............ 220/574 |

FOREIGN PATENT DOCUMENTS

DE  4018843 A  12/1991

* cited by examiner

Primary Examiner—Rinaldi I. Rada
Assistant Examiner—Hemant M Desai
(74) Attorney, Agent, or Firm—Hugnion S.A.; John Moetteli

(57) ABSTRACT

The lid is formed, on the one hand, of a ring (7) and, on the other hand, of a disk (D). The ring (A) comes from a strip cut parallel to the fibers of a fibrous rigid material. Having formed the ring (A) using a two-stage tool, the disk (D) is pressed on the ring (A) and the skirt (L') is bonded onto the ring (A). A nesting profile and a catch (3') in the form of a groove open toward the interior are formed. The lid fits onto a container (R) with a rolled edge (O).

24 Claims, 3 Drawing Sheets

METHOD FOR MANUFACTURING A PRESS-ON LID FOR A TUBULAR PACKAGING AND LID MANUFACTURED BY IMPLEMENTING THE METHOD

BACKGROUND OF THE INVENTION

The present invention relates to a method for manufacturing a press-on lid intended to be clipped onto a tubular container or a cup of any shape equipped with an outwardly rolled edge at its top end, the press-on lid consisting of a strip and of a pressed disk, and to a lid manufactured according to this method.

At the present time, mass-produced consumer products relating equally to the food industry, chemical industry and industrial industry, are packaged in packaging consisting of a number of materials and components. For several years, for ecological reasons, packagings made of readily recyclable materials, eliminating other materials such as plastics, metals (aluminum), etc. to the greatest possible extent, have been proposed.

SUMMARY OF THE INVENTION

The object of the present invention is to provide, for tubular packagings and cups equipped at their upper end with an outwardly rolled edge, a press-on lid which, once the membrane or protective inner seal sealing the upper part of the packaging has been removed, allows the packaging to be sealed sufficiently hermetically for the duration of its use, that is to say until the product contained has been used up. This characteristic also applies to packaging without a membrane or inner seal.

There are currently in existence packagings, for example for food products such as butter, margarine, yogurt, or alternatively cups containing a liquid beverage, and other products contained in containers of any size made of a recyclable material, for example cardboard. These containers are covered at their top by a lid clipped onto an outwardly rolled edge of the container thus allowing the container to be sealed as hermetically as possible fdferonce the protective membrane has been removed, until the product contained has been fully used up. This type of lid is essentially made of a plastic, which is satisfactory from the efficiency viewpoint, but not from the point of view of the recycling of waste and they are difficult to decorate. Attempts at using a recyclable material such as cardboard or the like have not proved satisfactory with respect to changes of temperature. The humidity alters the dimensions of the lid and it loses its effectiveness.

The object of the present invention is to provide a lid made of a recyclable material such as, for example, cardboard, making it possible to have effectiveness identical to that of a plastic lid in terms of the use of the lid once the protective membrane has been removed.

The method according to the invention is characterized by the following steps:
- a strip is cut from a rigid and fibrous material equipped on one of its faces with an adhesive, the cut being made parallel to the fibers of the material,
- a ring is formed on a form of a size equal to the internal dimensions of the lid, the length of the strip allowing the ends to be superposed around the form so that they can be sealed together,
- a disk is cut from a rigid material in a shape that corresponds to the lid prior to pressing,
- these are introduced into a two-stage tool, the disk being introduced into the upper part and the ring into the lower part,
- a heated punch is introduced into the ring and the disk is pressed and sealed onto the ring by means of said punch and of a die of said tool, the nesting profile is formed at the end of the travel of the punch.

The advantages of the method are as follows:
the use of a strip cut in the direction of the length of the fibers avoids any change in dimensions of the skirt of the lid because it has been found that with fibrous products such as cardboard, the fibers do not lengthen but simply swell under the influence of temperature and moisture. Thus, the dimensions of the lid do not change even after residing in a damp cold environment, household freezer or refrigerator, for some time.

A prototype of a lid was produced with a catch using a single layer of a material, for example of cardboard or any other equivalent fibrous material equipped only on the inside with a film. This prevented the product from coming into contact with the cardboard. However, because of the moisture and because of the deformation after one or two uses, the lid no longer effectively closed the packaging.

Following this experience, a way of achieving a lid made of these same recyclable materials but having the efficiency of a lid made, for example, of plastic was realized. The aforementioned solution was satisfactory because effective closure of the packaging is achieved even after this lid has been opened and closed a great many times.

According to a first special embodiment, a catch is formed by expansion in the form of a groove open toward the inside of the lid.

According to another embodiment, the disk protrudes beyond the ring over its entire periphery, and so after sealing the protruding part of the disk is turned back through 180° onto the interior wall of the ring and is smoothed and sealed. This construction is even more effective than the previous one and provides greater resistance to deformation as a result of moisture and temperature changes to which the packaging is subjected.

According to another variant of the invention, the rigid material is cardboard or paper.

According to another embodiment, the adhesive material is an adhesive activated by heat or by cold.

According to another variant, the width of the strip approximately corresponds to the distance between the end of the skirt of the lid and the catch.

According to another variant, the adhesive material is a film activated by heat or by cold.

According to another embodiment, the disk is equipped with a protective film to prevent the packaged product from coming into direct contact with this disk.

The invention also relates to a lid fabricated according to the method of the present invention.

BRIEF DESCRIPTION OF THE DRAWINGS

The invention will be described in greater detail with the aid of the appended drawings which depict three preferred embodiments of the present invention.

DETAILED DESCRIPTION OF THE PREFERRED EMBODIMENT(S)

Figure 1:
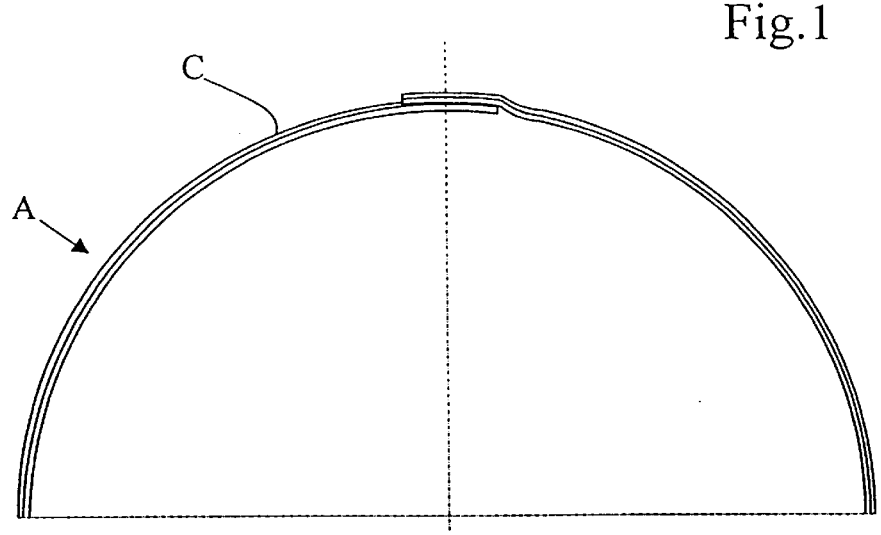
FIGS. 1, 2, 3 and 4 depict a first embodiment.
Figure 2:
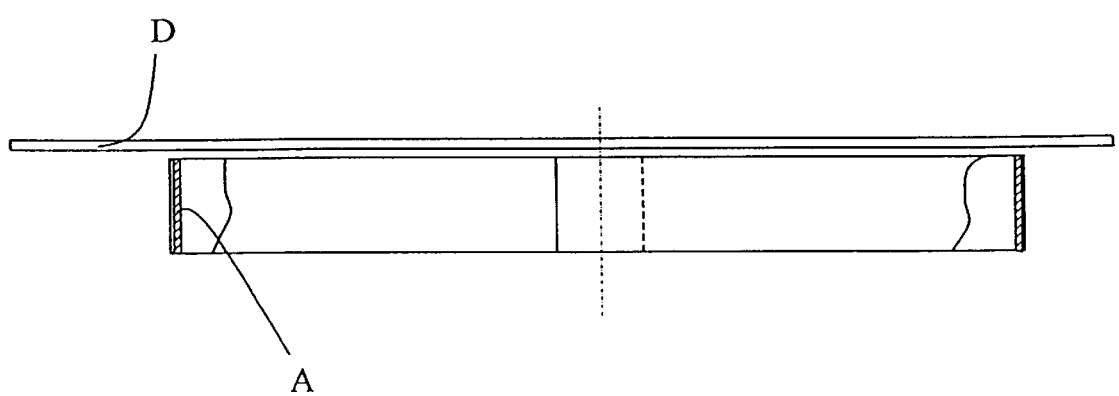
Figure 3:
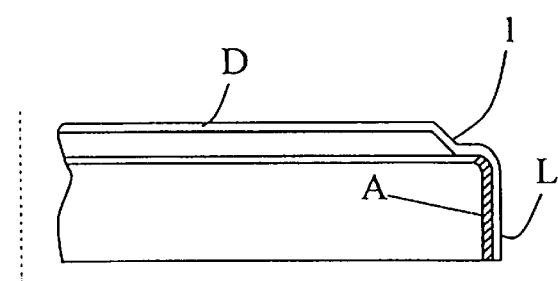

FIG. 1 depicts a ring A formed of a strip cut from a material such as cardboard in the direction of the fibers, said ring being formed on a heated punch that allows the two ends of the ring to be sealed together. The size of the ring corresponds to the interior dimensions of the lid that is to be formed. The ring A and, more specifically, the material of which it is formed, is equipped on one of its faces with an adhesive C allowing the two ends of the ring to be sealed together and then to be sealed to a disk.

Subsequently, a disk D, the dimensions of which correspond to the lid to be formed prior to pressing, is cut from a material which may be the same material and these two elements are introduced into a two-stage tool, the ring A into the lower stage and the disk D into the upper stage. This tool comprises a die (not depicted) and a punch (not depicted) allowing the lid to be formed by pressing with the desired dimensions and shape. The heated punch is pushed into the ring A and moves forward toward the disk D which is pressed around the ring A, thus forming the lateral skirt L of the lid and at the same time this skirt of the disk D is sealed onto the ring A. As it continues its stroke, the die forms the nesting profile 1. Thereafter, by expansion, the catch 3 is formed, this in reality being a groove open toward the inside. This catch will clip onto the rolled edge of the upper part of the tubular packaging.

Figure 5:
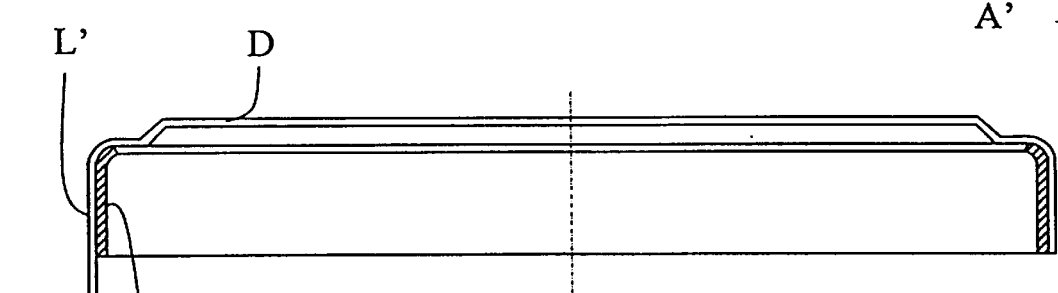
FIGS. 5, 6, 7 depict a second embodiment of the method.
Figure 6:
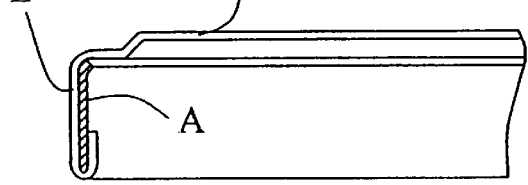

According to a variant embodiment, the disk D has dimensions greater than the lid prior to pressing, as depicted in FIG. 5, so that when it is pressed in the two-stage tool, its skirt L' protrudes beyond the ring A which, as depicted in FIG. 6, allows this protruding part to be folded over toward the inside of the lid, thus providing the lid with better strength and rigidity. Thereafter, the method is completed as usual, namely with the formation of a groove, of a catch 3', as depicted in FIG. 7.

Figures 4, 8:
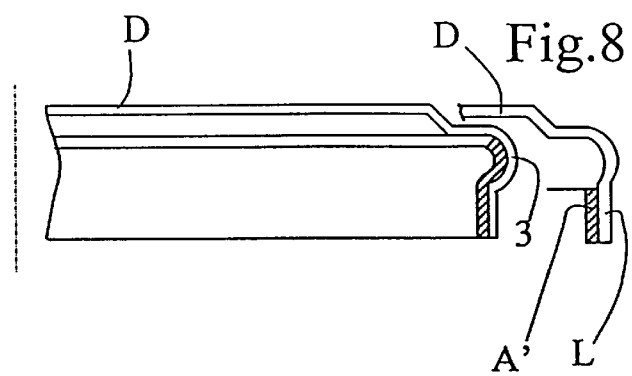
FIG. 8 depicts a third embodiment.
Figures 7, 9:
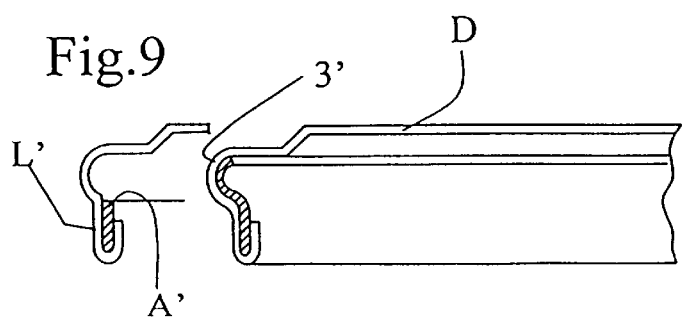
FIG. 9 depicts a variant of the lid of FIG. 8.

Finally, with a view to saving material, it is possible to provide strips to form a ring whose width is smaller than the total length of the skirt, that is to say that the ring may occupy a space between the end of the skirt and the position of the catch as depicted in FIG. 8 or 9. This is particularly true of small packaging without reducing the effectiveness of the lid.

Obviously, the disk could be printed on its upper face or equipped with a pre-printed film. It is also possible for the disk to be equipped on the inside with a protective film to prevent the contents from coming into contact with the disk.

The shape of the lid corresponds to the cross section of the tubular packaging and may just as easily be round, rectangular, triangular or hybrid without this having any consequence on the invention.

The rigid material used for manufacturing both the ring and the disk may be a stock of sheets or reels.

Figure 10:
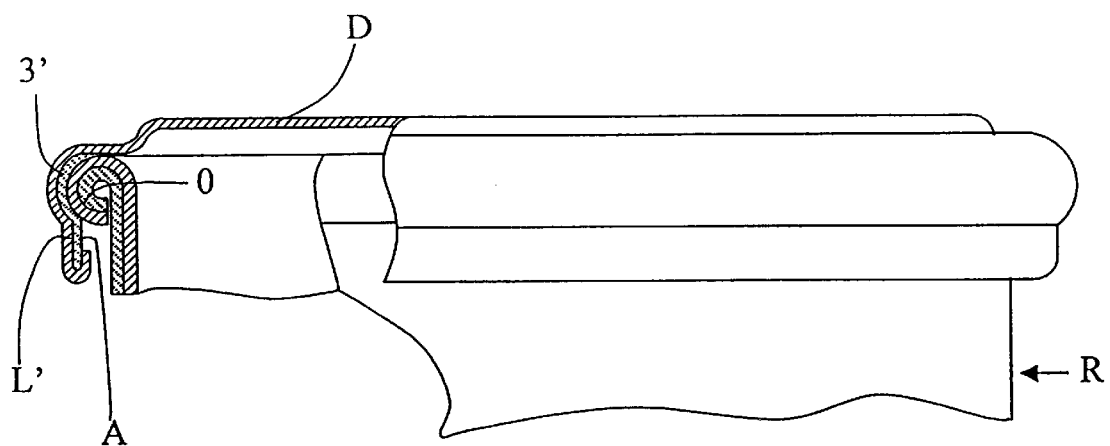
FIG. 10 depicts the upper part of a container covered with the lid of FIG. 7.

Finally, FIG. 10 depicts the lid of FIG. 7 fitted onto a container R. The container is equipped at its upper end with a rolled edge O collaborating with the catch 3'.

Figure 11:
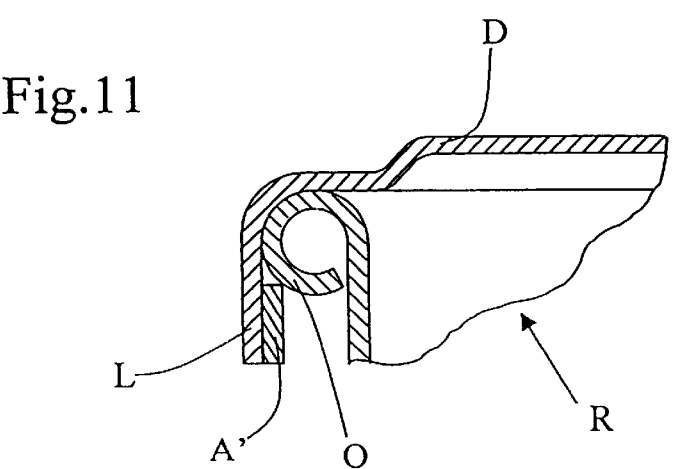
FIG. 11 depicts a simplified embodiment.

A simplified embodiment of the lid is depicted in FIG. 11. In this case, the formation of a catch and the interlocking of the lid with the rolled edge O of the upper end of the container is done by the ring A' supported by the lateral skirt L of the lid.

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed:

1. A method for manufacturing a press-on lid intended to be clipped onto a tubular container, the container equipped with an outwardly rolled edge at its top end, the lid comprising a strip and a pressed disk, characterized by the following steps:
    cutting the strip from a rigid and fibrous material having on one of its faces an adhesive, the cut being made parallel to the fibers of the material,
    forming a ring on a form of a size equal to the internal dimensions of the lid, the length of the strip allowing the ends to be superposed around the form so that they can be sealed together,
    cutting a disk from a rigid material in a shape that corresponds to the lid prior to pressing,
    introducing the ring and disk into a two-stage tool, the disk being introduced into an upper part and the ring into a lower part,
    introducing a heated punch into the ring and pressing and sealing the disk onto the ring by means of said punch and of a die of said tool, and
    forming a nesting profile at the end of the travel of the punch.

2. The method according to claim 1, wherein a catch is formed by expansion in the form of a groove open toward the inside of the lid.

3. The method as claimed in claim 1, wherein the disk protrudes over its entire periphery beyond the ring and, after sealing, the protruding part of the disk is turned back through 180° onto the interior wall of the ring formed, and this turned-back part is smoothed and sealed.

4. The method as claimed in claim 2, wherein the disk protrudes over its entire periphery beyond the ring and, after sealing, the protruding part of the disk is turned back through 180° onto the interior wall of the ring formed, and this turned-back part is smoothed and sealed.

5. The method as claimed in claim 1, wherein the rigid material is cardboard or paper.

6. The method as claimed in claim 2, wherein the rigid material is cardboard or paper.

7. The method as claimed in claim 3, wherein the rigid material is cardboard or paper.

8. The method as claimed in claim 4, wherein the rigid material is cardboard or paper.

9. The method as claimed in claim 1, wherein the adhesive material is an adhesive activated by heat or by cold.

10. The method as claimed in claim 2, wherein the adhesive material is an adhesive activated by heat or by cold.

11. The method as claimed in claim 3, wherein the adhesive material is an adhesive activated by heat or by cold.

12. The method as claimed in claim 4, wherein the adhesive material is an adhesive activated by heat or by cold.

13. The method as claimed in claim 5, wherein the adhesive material is an adhesive activated by heat or by cold.

14. The method as claimed in claim 6, wherein the adhesive material is an adhesive activated by heat or by cold.

15. The method as claimed in claim 7, wherein the adhesive material is an adhesive activated by heat or by cold.

16. The method as claimed in claim 8, wherein the adhesive material is an adhesive activated by heat or by cold.

17. The method as claimed in claim 1, wherein the adhesive material is a plastic film activated by heat or by cold.

18. The method as claimed in one of claims 2 to 16, wherein the adhesive material is a plastic film activated by heat or by cold.

19. The method as claimed in claim 1, wherein the width of the strip approximately corresponds to the distance between the end of the skirt of the lid and the catch.

20. The method as claimed in one of claims 2 to 17 or 19, wherein the width of the strip approximately corresponds to the distance between the end of the skirt of the lid and the catch.

21. The method as claimed in claim 1, wherein the disk is equipped on its underside with a protective film to prevent the packaged product from coming into contact with the disk.

22. The method as claimed in one of claims 2 to 17, 19 or 21 wherein the disk is equipped on its underside with a protective film to prevent the packaged product from coming into contact with the disk.

23. A lid manufactured according to the method as claimed in claim 1.

24. A lid manufactured according to the method as claimed in one of claims 2–17, 19, 21 or 23.

\* \* \* \* \*

UNITED STATES PATENT AND TRADEMARK OFFICE
CERTIFICATE OF CORRECTION

PATENT NO. : 6,544,159 B2
DATED : April 8, 2003
INVENTOR(S) : Sireix

It is certified that error appears in the above-identified patent and that said Letters Patent is hereby corrected as shown below:

<u>Title page,</u>
Item [74], *Attorney, Agent or Firm*, replace "Hugnion S.A." by -- Bugnion S.A. --

Signed and Sealed this

Thirteenth Day of January, 2004

JON W. DUDAS
*Acting Director of the United States Patent and Trademark Office*